3,563,116
PORTABLE UPRIGHT BORING MILL
Grigory Yakovlevich Gurvich, Ulitsa Zamshina 21, kv.
 68; Leonid Sergeevich Krajukhin, Dalnevostochny
 prospekt 19, kv. 34; and Rady Nikolaevich Verbitsky,
 Nevsky prospekt 20, kv. 2, all of Leningrad, U.S.S.R.
Filed July 31, 1968, Ser. No. 749,160
Int. Cl. B23b 39/14
U.S. Cl. 77—2
4 Claims

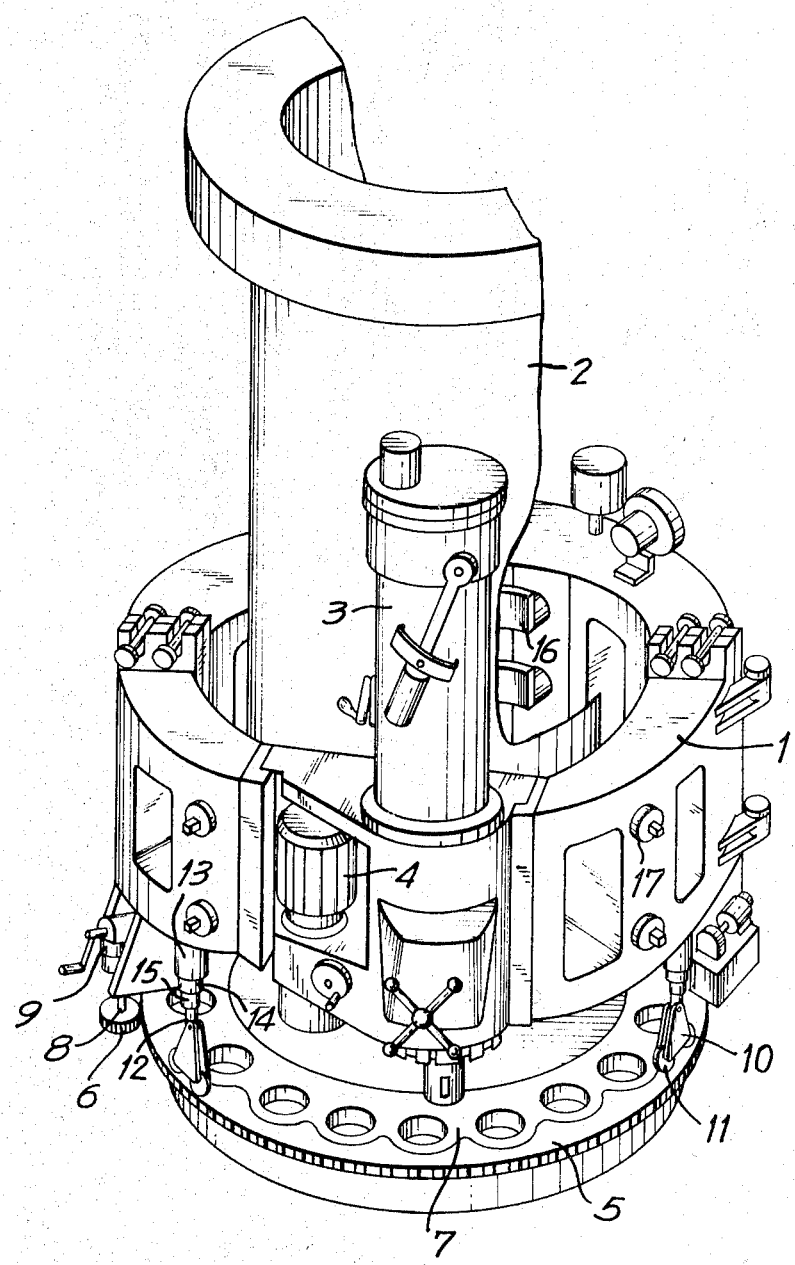

ABSTRACT OF THE DISCLOSURE

A portable upright boring mill comprises a split hollow cylinder body which can be attached to the shaft of a workpiece whose flange is to be machined by boring holes therein. The mill is mounted on the workpiece by fitting the body on the shaft so that it surrounds the same and the body comprises a spindle head for machining the holes in the flange. The body can be moved along the workpiece flange by means of a turning mechanism which includes a drive installed on the mill body and engaged with a gear in turn engaged with a toothed rim secured on the workpiece flange. The body rests on supports which are articulated to carriages which roll on the flange for travel of the mill thereon.

The present invention relates to portable boring mills secured on the workpieces for machining holes in flanges thereof and can be used at mechanical engineering plants; more specifically this invention relates to the portable boring mills for machining holes in flanges of large-sized articles, for example, for boring holes in the flanges of the rotor wheel and shaft of a hydraulic turbine.

Known in the art the portable boring mills, secured to the shafts of workpieces, for machining holes in the flanges thereof. However, these mills have horizontal spindles and are intended for horizontal boring of holes in flanges and cannot, therefore, be used for machining large-sized articles owing to considerable deformations occurring in said articles during horizontal machining and reducing the machining accuracy. Besides, the mill body made in the form of a flat plate is rigidly secured to the shaft of the article being machined which prevents the required adjustments with respect to the flange and quick resetting of the article for boring a number of holes in the flange. This impairs the machining accuracy and increases the time of the mill resetting required for machining each new hole.

An object of the present invention resides in eliminating the aforesaid disadvantages.

The main object of the invention resides in providing a portable upright boring mill for machining holes in the flanges of articles, said mill ensuring a high machining accuracy and requiring but a short time for resetting the machine before boring each new hole.

This object is carried into effect by providing a portable upright boring mill for machining holes in the flanges of workpieces, secured to said workpieces, which, according to the invention, has a body carrying a spindle head rigidly secured to it, said body being of a closed circular shape so as to fit around the shaft of a workpiece being machined, after the machine is installed in position.

Besides, the mill is provided with a turning gear for moving the body over the workpiece flange. It is practicable to make the mill body in the shape of a split hollow cylinder.

The turning gear may comprise a gear drive whose toothed rim is fixed on the workpiece flange, while the gear meshing with said rim is mounted on the output shaft of the turning gear drive. The drive may be installed on the mill body resting on supports which are articulated to carriages through which the turning gear moves the mill.

The mill may incorporate a device for adjusting its position relative to the flange. It is practicable to make this device in the form of a screw-and-nut gear consisting of a nut rigidly connected to the mill frame and a hollow screw fitted up to a stop onto the free end of the support.

The mill may have clamps for holding the mill body in position for machining each hole. It is practicable to make the clamps in the form of pneumohydraulic devices.

Now the invention will be described in detail by way of example with reference to the appended drawing the sole figure of which illustrates in axonometric projection a portable upright boring mill for machining holes in the flange of workpieces, said mill being secured to said workpiece, according to the invention.

The portable upright boring mill for machining holes in the flanges of workpieces, secured to said workpieces, comprises a closed body 1 which, after the mill is installed on a workpiece 2, fits around its shaft. The body 1 is made in the form of a split hollow cylinder whose halves are rigidly fastened to each other after the mill is installed on the workpiece. The split design of the body 1 contributes to convenient installation and removal of the mill.

Rigidly built into one of the halves of the body 1 is a spindle head 3 which rotates the spindle and feeds the tool with the aid of a drive 4 which is also built into the mill body 1. In addition, the spindle head 3 has an independent drive (not shown in the drawing) for rapid feeding and withdrawing of the cutting tool.

The mill is provided with a body turning gear. This mechanism comprises a gear drive consisting of a toothed rim 5 and a gear 6. The rim 5 is fitted on the flange 7 of the workpiece and is secured to it. The gear 6 meshing with the rim 5 is mounted on the output shaft 8 of the turning gear drive 9 which latter is installed on the mill body 1.

The body is moved circumferentially when the gear 6 rolls over the stationary toothed rim 5 with the aid of carriages 10 which are provided, each, with two rollers 11.

The carriages 10 are hinged to supports 12 on which the body 1 rests.

The mill is provided with a device for adjusting its position with respect to the workpiece flange 7, said device being in the form of a screw gear. This gear consists of a nut 13 rigidly connected to the body 1 and a hollow screw 14 fitted up to a stop 15 on the free end of the support 12.

The mill is provided with clamps 16 which hold the mill body in position while each hole is being bored. The clamps 16 are of the pneumohydraulic type and will not be dealt with in detail hereunder.

The mill has screw stops 17 for adjusting its position with relation to the londitudinal axis of the workpiece. The screw stops 17 are made of a conventional "screw-and-nut" gear type and will not be considered here in detail.

What we claim is:

1. A portable upright boring mill for machining holes in the flange of a workpiece attached to a shaft thereof, said mill being mounted on said workpiece and comprising: a body of a closed shape so that after installation of the mill it fits around the workpiece shaft; a spindle head rigidly secured on said body; turning means for moving said body along the workpiece flange, said turning means comprising a drive means installed on the mill body; supports on which said body rests; carriages articulated to said supports and resting on said flange for travel of the mill thereon; and a gear drive including a toothed rim secured on the workpiece flange and a gear driven by said drive means and engaged with said toothed rim.

2. A boring mill, according to claim 1, wherein the body is constituted as a split hollow cylinder.

3. A boring mill, according to claim 1, comprising a device for adjusting the position of the mill with respect to the workpiece flange.

4. A boring mill, according to claim 1, comprising clamps for holding the mill body in position while each new hole is being machined.

References Cited
UNITED STATES PATENTS

| | | | |
|---|---|---|---|
| 596,295 | 12/1897 | French | 77—2 |
| 1,829,458 | 10/1931 | Scoggins | 77—2 |
| 2,368,476 | 1/1945 | King | 77—2 |
| 3,103,834 | 9/1963 | Nelikom | 77—2 |

GERALD A. DOST, Primary Examiner

U.S. Cl. X.R.

90—12